United States Patent [19]

Adams et al.

[11] Patent Number: 5,778,350

[45] Date of Patent: Jul. 7, 1998

[54] DATA COLLECTION, PROCESSING, AND REPORTING SYSTEM

[75] Inventors: Raymond J. Adams, Frisco; Harriet E. Brichta, Plano; Roger J. Henn, Lucas, all of Tex.; Drew A. Hollander, Rochester, N.Y.; Robert W. Adas, McKinney, Tex.; Gerald R. Dolan, Melissa, Tex.; Donna M. Bermender, Leander, Tex.; William D. Hawthorne, Plano, Tex.

[73] Assignee: Electronic Data Systems Corporation, Plano, Tex.

[21] Appl. No.: 566,429

[22] Filed: Nov. 30, 1995

[51] Int. Cl.$^6$ .................................................. G06F 17/30
[52] U.S. Cl. .................................................. 707/1; 707/102
[58] Field of Search .................. 395/601; 364/419.19, 364/200, 900, 405, 408, 403, 401; 340/172.5; 235/176, 92; 707/1, 102

[56] References Cited

U.S. PATENT DOCUMENTS

| | | |
|---|---|---|
| 3,822,378 | 7/1974 | Kashio .................................. 235/176 |
| 4,003,031 | 1/1977 | Kashio .................................. 340/172.5 |
| 4,031,515 | 6/1977 | Kashio .................................. 364/200 |
| 4,032,900 | 6/1977 | Kashio .................................. 364/200 |
| 4,034,350 | 7/1977 | Kashio .................................. 364/900 |
| 4,064,553 | 12/1977 | Kashio .................................. 364/200 |
| 4,079,234 | 3/1978 | Kashio .................................. 235/92 |
| 4,103,334 | 7/1978 | Kashio .................................. 364/900 |
| 4,133,041 | 1/1979 | Kashio .................................. 364/900 |
| 4,321,672 | 3/1982 | Braum et al. .......................... 364/408 |
| 4,360,872 | 11/1982 | Suzuki et al. .......................... 364/405 |
| 4,370,707 | 1/1983 | Phillips et al. ......................... 364/200 |
| 4,555,759 | 11/1985 | McCaskill et al. ..................... 364/300 |
| 4,633,397 | 12/1986 | Macco .................................. 364/406 |
| 4,730,252 | 3/1988 | Bradshaw ............................. 364/403 |
| 4,809,170 | 2/1989 | Leblang et al. ....................... 364/200 |
| 4,851,999 | 7/1989 | Mariyama ............................ 364/401 |
| 4,852,000 | 7/1989 | Wevv et al. .......................... 364/401 |
| 5,526,518 | 6/1996 | Kashio ................................. 395/601 |
| 5,528,492 | 6/1996 | Fukushima ........................... 364/419.19 |

*Primary Examiner*—Thomas G. Black
*Assistant Examiner*—Frantz Coby
*Attorney, Agent, or Firm*—Wei Wei Jeang; T. Murray Smith; L. Joy Griebenow

[57] ABSTRACT

A system and method (10) for collecting and processing input data (16) and generating output data (24). The system (10) uses a plurality of dictionary tables (22) to control the reading, processing, and outputting of data. The system (10) includes at least one input processing table (32) having format and content information of the input data (16), and at least one output processing table (34) having format and content information of said output data (24). A multi-tasking process (60) is used to spawn a plurality of subtasks (90), each subtask processing one type of data, said subtasks accessing said input processing table (32) for determining how said input data (16) are to be read, and further accessing said output processing table (34) for determining how to create and format said output data (24). Other data dictionary tables (22) are used to track system activity and statistics, define the system that generated the data, and avoid duplicate processing of data.

63 Claims, 6 Drawing Sheets

5,778,350

1

DATA COLLECTION, PROCESSING, AND REPORTING SYSTEM

TECHNICAL FIELD OF THE INVENTION

This invention is related in general to the field of data processing systems. More particularly, the invention is related to a data collection, processing, and reporting system.

BACKGROUND OF THE INVENTION

Several data collection, processing, and reporting systems are currently available, such as MVS Integrated Control System (MICS)® and Job Accounting Reporting System (JARS)® both by Computer Associates, and Service Level Reporting® by International Business Machines (IBM). These systems typically collect large volumes of raw input data, converts it into useful information, and manages and reports the information. However, these conventional systems have several drawbacks that make them inefficient and inadequate particularly for applications in which very large quantities of raw data are collected from distributed and autonomous business units of a large organization.

For example, some of these existing systems typically have all input and output record formats hard coded into the code so that input record and output report formats cannot be changed dynamically. Other systems try to compensate for this deficiency by providing a source code distributed package so that users may customize the system by altering the source code. However, this type of uncontrolled flexibility would be unsatisfactory for the large organization scenario, because there would be no uniformity or consistency across the organization. These systems are also typically designed to be installed at a single and central site, to which raw input data is transmitted from distributed units. The data are then processed and managed at the central site. Reporting is often only available at the central site and not at the distributed locations where the data is generated. Further problems with existing systems include the inefficient practice of restoring and then reprocessing all previously processed records in the database when data collection and processing is restarted after an abend.

Accordingly, there is a need for a data collection, processing, and reporting system that is better suited to a large organization collecting and processing large quantities of raw data from distributed business units. The desired system would collect and manage data, and provide reporting in a much more efficient and flexible manner than conventional systems.

SUMMARY OF THE INVENTION

In accordance with the present invention, a system and method for collecting, processing, and reporting data are provided which eliminates or substantially reduces the disadvantages associated with prior systems and methods.

In one aspect of the invention, the system and method for collecting and processing input data and generating output data includes at least one input processing table having format and content information of the input data, and at least one output processing table having format and content information of the output data. A multi-tasking process is used to spawn a plurality of subtasks, each subtask processing one type of data, the subtasks accessing the input processing table for determining how the input data are to be read, and further accessing the output processing table for determining how to create and format the output data.

2

In another aspect of the invention, a plurality of data dictionary tables are provided that controls the reading, processing, and outputting of data. The plurality of data dictionary tables include at least one input processing table having format and content information of the input data, and at least one output processing table having format and content information of the output data.

BRIEF DESCRIPTION OF THE DRAWINGS

For a better understanding of the present invention, reference may be made to the accompanying drawings, in which.

DETAILED DESCRIPTION OF THE INVENTION

Figure 1:
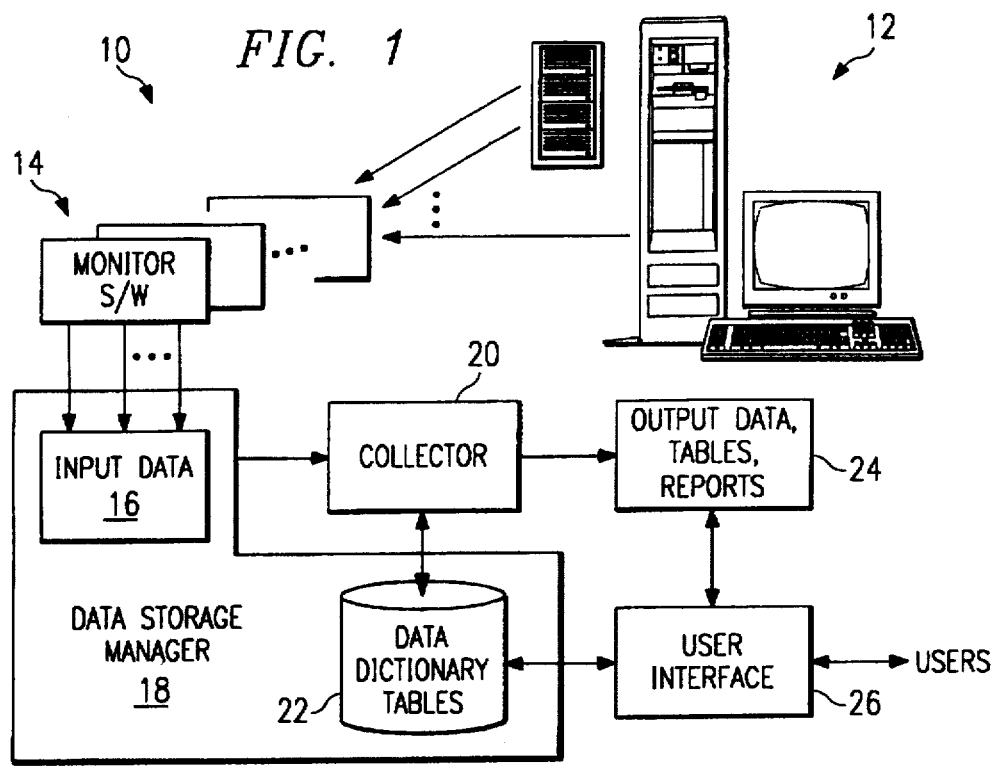
FIG. 1 is a top level block diagram of an embodiment of a data collection, management, and reporting system constructed in accordance with the teachings of the present invention.

The preferred embodiment(s) of the present invention is (are) illustrated in FIGS. 1-8, like reference numerals being used to refer to like and corresponding parts of the various drawings.

Referring to FIG. 1, an embodiment of the data collection, management, and reporting system is indicated generally at 10 and constructed according to the teachings of the present invention. Although the source of raw data 16 may be any device, instrumentation, or system, the present invention is shown and described herein in the context of data generated by various monitors 14 that collect data on resource or equipment usage. These resources 12 may include data storage devices, databases, CPUs, mainframes, computer networks, gateways, and any resource the usage of which can be measured. Examples of monitor software 14 include CICS®, TSO®, SMF®, RMF®, VM®, all by IBM, IMF® by Boole and Babbage, and TSOMAN® and IDMS® by Computer Associates. The large quantity of raw input data 16 is managed by a data storage manager 18 such as IBM's DF/HSM®.

A collector 20 then collects raw input data 16, computes output values, and provides output data in the form of tables and reports 24. Output tables generated by collector 20 may be used by other applications, such as general ledger and forecasting, for further processing. Collector 20 may be directed to run several times throughout a day as data becomes available or as a batch job. Data from all monitors 14 in different record types and formats may be processed in the same run. The actions of collector 20 is controlled by input data parameters and data dictionary tables 22. As shown, data dictionary tables 22 may also be managed by the same data storage manager 18 as input data 16. An interactive user interface 26 is provided to allow users to access information in data dictionary tables 22 and output data 24, and to modify and update the information in data dictionary tables 22. Preferably, user interface provides a menu-driven graphical interface for viewing and maintaining the information stored in data dictionary tables 22 and output data 24. Special grant and view rules specified in data dictionary tables 22 define what information, i.e. which tables and which rows and columns, a user is authorized to view and/or change.

Figure 2:
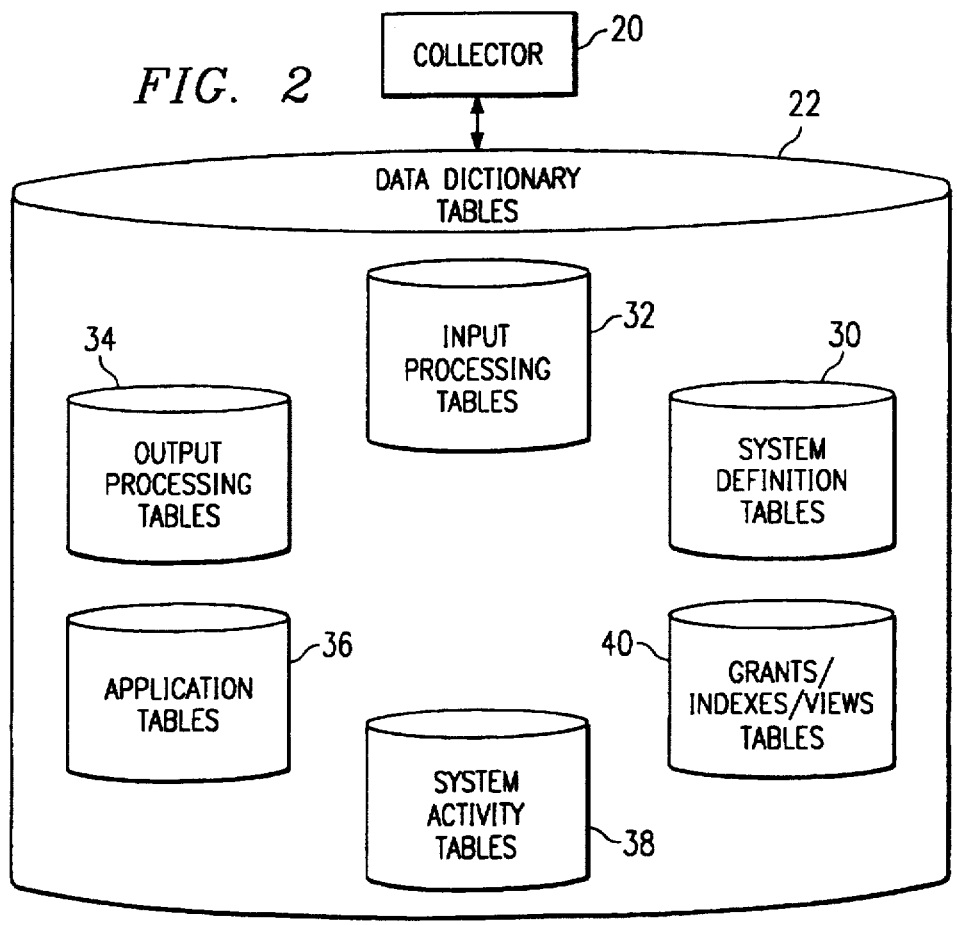
FIG. 2 is a block diagram of the data dictionary tables.

FIG. 2 shows six categories of data dictionary tables 22 used to control the various actions of collector 20 in the data collection, management, and reporting process. Because the use of data dictionary tables 22, the present invention is a very flexible data processing and management system. Changes and modifications can be made by altering the information in the data dictionary tables rather than the source code. Other existing applications require substantial source code modifications to expand or change their functions.

In one embodiment of the present invention, data dictionary tables 22 are maintained as DB2 tables. DB2 is IBM's relational database manager in which data are stored in tables consisting of columns and rows. The specific references to DB2 herein should not be construed as limiting the teachings of the present invention to the use of DB2 when other relational database managers are applicable. DB2 is merely an exemplary relational database manager used in the discussion herein. Data dictionary tables 22 include: system definition tables 30, input processing tables 32, output processing tables 34, application tables 36, system activity tables 38, and grants/indexes/views tables 40. Each group of tables are described in below with some details given on certain selected tables. Exemplary table layout and format of certain selected dictionary tables are presented along with discussions on these tables.

System definition tables 30 contain information specific to the system on which the input records are collected. The PSYSID (physical system ID) is the system identification of the machine that generated the data, while the LSYSID (logical system ID) is the system identification under which output is collected and retained. A LSYSLKP (logical system ID lookup) table provides a mapping of the PSYSIDs to the LSYSIDs, as well as information about the machine and the system. A CPUMODEL (CPU model) table contains additional information, such as a speed factor used for CPU normalization established by the organization.

System definition tables 30 also include a RECTYLKP (record type lookup) table which provides a mechanism for processing records that do not conform to the organization's numbering standards. For example, some vendor products may generate SMF records with optional record numbering. It is reasonable to expect that new or migrating accounts might use a record numbering system different from the organization's standards. To facilitate processing in such cases, the RECTYLKP table maps the record numbers contained in the data with the record numbers used in dictionary tables 22.

Input processing tables 32 are used by collector 20 to read and process the input records. For example, a RECNAME (record name) table provides the general characteristics of the record being read, including information on how to determine the PSYSID, RECTYPE (record type), and SUBTYPE (sub-division of a record type). The RECNAME table also provides other general processing considerations like error limits, checkpoint retention limits, and the record exclusion expressions for invalid record formats or skip records. Checkpointing describes the process of time stamping a record so that upon restart after an abend, it may be identified as processed or not processed. Processed records are skipped over until an unprocessed record is reached for data collection and processing to continue. An exemplary layout for the RECNAME table is shown below:

| RECNAME | | | | |
|---------|---------|---------|---------|---------|
| RECNAME | RECTOFF | RECTLEN | RECTDATA | SUBTOFF |
| SMF | 5 | 1 | BINARY | 22 |
| SUBTLEN | SUBTDATA | PSYSOFF | PSYSLEN | PSYSDATA |
| 2 | BINARY | 14 | 4 | EBCEDIC |
| TSOFF | TSLEN | TSDATA | COMMIT | PROTFLAG | VALIDREC |
| 6 | 8 | BINARY | 1000 | N | LENGTH>14 |
| . | | | | | |
| CHKPTRET | OLDDATA | TS2OFF | TS2LEN | TS2DATA | SKIPREC |
| 60 | 0 | 7 | 5 | BINARY | |

The RECTOFF column contains the offset of the field containing the RECTYPE for the specified RECNAME. RECTLEN contains the length of the field containing the RECTYPE for the specified RECNAME. RECTDATA contains the data type for the field. The SUBTXXXX columns similarly contain the specifications for the field containing the SUBTYPE for the specified RECNAME. Similarly, the PSYSXXXX columns contain specifications for the field containing the PSYSID for the specified RECNAME. The TSXXXX columns contain the specifications for the field containing the time stamp for the specified RECNAME.

The COMMIT column contains the number or character string that causes collector 20 to issue a commit statement. PROTFLAG is used to specify whether a row or column can be modified or deleted by a user using user interface 26 to access the table. For example, an N designation in this column indicates some columns in the row can be modified; an S designation indicates that the row cannot be modified or deleted; and a U designation indicates the row can be modified. The PROTFLAG is used in many other tables in a similar manner. The VALIDREC column contains a boolean expression used to determine whether an input record 16 is valid. VALIDREC may be an offset into the record, functions, and operators.

CHKPTRET is a column containing the number of days to retain data in a checkpoint summary table (CHKPTSUM) for the specified RECNAME. Checkpointing is used to detect duplicate processing of a record. Each input record has an entry in a base table. The base table contains the time stamps of a uniquely defined set of records, based on date, record type, subtype, system, or a combination of these properties. The base table is checked prior to reading and processing each input data record to determine if the record has been process previously. When a base table is deleted, the CHKPTSUM table is updated to include a summarization of the detail data, including the range of time stamps of records belonging to the deleted base table. CHKPTRET is used to specify how many days an entry in the CHKPTSUM table is to be retained. The OLDDATA column contains the limit on the number of records too old to be checkpointed in a single collector run. When the limit is exceeded, the subtask abends with a specific return code. A value of zero as shown indicates there is no limit. The columns starting with TS2 are columns that contain information about a secondary field used to determine the time stamp for the specified RECNAME. Finally, the SKIPREC column contains a boolean expression evaluated for each record to determine whether the record is to be processed. The SKIPREC expression may contain offsets into the record, functions, and operators. If the evaluation is true, then the record is skipped.

Input processing tables 32 of data dictionary tables 22 further include a SOFTREL (software release) table used to determine the release version of the software that generated the input data record. For example:

| SOFTREL | | | | |
|---|---|---|---|---|
| SOFTWARE | RELEASE | RECNAME | RECTYPE | PROTFLAG |
| MVS/BAT | V01R03M05 | SMF | 30 | S |
| IDMS | V10R01M00 | ID2 | 6 | S |
| DASDBILL | V03R00M06 | DSD | 0 | S |

| RELFORM |
|---|
| SUBSTR (#RECORD, 19, 3) = 'JES' & COMPARE(SUBSTR(#RECORD ... |
| SUBSTR (#RECORD,49,4) = 'R102' |
| #RECLEN < 91 |

The RELFORM are boolean expressions used to identify each unique SOFTWARE, RECNAME, RECTYPE, and RELEASE combination supported by system 10. During a collector run, all RELFORMs for the RECNAME and RECTYPE are evaluated. If an expression evaluates as true, the SOFTWARE and RELEASE associated with the REL-FORM are assigned to the input data. If none of the expressions evaluate as true, the record is rejected as an unsupported release.

Further input processing tables 32 include a SECTTYPE (section type) table defines the parameters required by formulas or algorithms for calculating offsets to the various sections within the record. A SECTION table identifies the formula or algorithm used to resolve the offset to each section in the record. A INPUTFLD (input field) table contains the data type, data length, and offsets within the section for each input field in the record. A TSTYPE (time stamp type) table contains the information needed to create the checkpoints for records that do not contain a time stamp field. A INPUTREC (input record) table contains an expression used to discard entire input records based on certain input field values. A CICVTREL (CICS VTAM release) table, CICDICTB (CICS dictionary) table, and CICREGN (CICS region) table are used for special IBM-defined CICS data processing. Input processing tables 30 also include some tables used for referential integrity not described specifically herein.

Output processing tables 34 provide the information needed to create and write rows to the output tables. For example, a NAMETYPE (name type) table contains the information needed to name the table and its objects. A OUTTBL (output table) table is used to define important characteristics for output tables identified by TABLEID, an identifier for the output table. Some of these characteristics may include: the table timespan (TIMESPAN), the filter or expression used to exclude certain rows, the criteria to activate table maintenance jobs, and the number of days to keep a table before migrating, archiving or deleting it (DAYSMIGR). TIMESPAN is described in more detail in conjunction with output tables 24 below. TABLEID identifies a group or family of output tables that share similar characteristics. TABLEID is the key in the OUTTBL table that is used to define the characteristics of a group of output tables. TABLEID is also used to tie together output columns, applications, and record types. Below is an example of a portion of the OUTTBL table.

| OUTTBL | | | | |
|---|---|---|---|---|
| TABLEID | TIMESPAN | NAMETYPE | DAYSMIGR | ... |
| SMF03004CPUTB | W | 1 | 30 | ... |

An OUTTBLRC (output table records) table is used to identify the specific records by information such as RECNAME, RECTYPE, and SUBTYPE that are used as input to the table identified by TABLEID. The PROTFLAG column in the tables is used to determine whether the row can be modified or deleted or if only certain columns of the row can be modified by users using user interface 26 to access the table. An exemplary portion of the OUTTBLRC table is shown below.

| OUTTBLRC | | | | |
|---|---|---|---|---|
| RECNAME | RECTYPE | SUBTYPE | TABLEID | PROTFLAG |
| SMF | 30 | 4 | SMF03004CPUTB | S |

A COL (column) table contains the general definitions of the output columns and the data type (OUTTYPE) and length (OUTLENG) for each output column. An OUTDESC column contains textual description of the entries.

COL

| COL | OUTTYPE | OUTLENG | PROTFLAG | OUTDESC |
|---|---|---|---|---|
| CPU | INTEGER | 4 | S | CPU TIME |
| DATE | CHAR | 10 | S | Date |
| HOUR | SMALLINT | 2 | S | Hour of the day 0–23 |
| JOBNAME | CHAR | 6 | S | Job name |

An OUTCOL (output column) table contains the formulas (FORMULA) used to calculate the values in an output column identified by SOFTWARE, RELEASE, RECNAME, RECTYPE, and SUBTYPE. For example:

OUTCOL

| SOFTWARE | RELEASE | RECNAME | RECTYPE | SUBTYPE |
|---|---|---|---|---|
| MVS | V02R01M03 | SMF | 30 | 04 |
| MVS | V02R01M03 | SMF | 30 | 04 |
| MVS | V02R01M03 | SMF | 30 | 04 |
| MVS | V02R01M03 | SMF | 30 | 04 |
| MVS | V02R01M03 | SMF | 30 | 04 |
| MVS | V02R01M03 | SMF | 30 | 04 |
| MVS | V02R01M03 | SMF | 30 | 04 |

| COL | ROW | FORMULA |
|---|---|---|
| ACCESS | 1 | SMF30ACT |
| BILLELEM | 1 | IF(PRIME(SMF30RST,SMP30RET),0027,0026) |
| BILLELEM | 2 | 0022 |
| DATE | 1 | SMF30DTE |
| HOUR | 1 | HOUR(SMF30TME) |
| QUANTITY | 1 | (SMF30CPT+SMF30CPS) |
| QUANTITY | 2 | (SMF30CPT+SMF30CPS) |

The formula is written in a formula language interpreted and evaluated at execution time. Because the formulas are stored in the OUTCOL table, the source code need not be modified or recompiled when changes in the formulas are desired. The formulas may yield boolean values or numerical values. For example, some formulas resolve to true or false to aid in processing decisions within collector 20. Other formulas return calculated values to be stored in output tables. Arithmetic operations such as addition, subtraction, multiplication, division, and exponentiation are provided. Bit string operations such as logical AND, OR, and concatenation are also available. There are also other formulas that can be used to generate pseudo logical system identifier (LSYSID).

An OUTCOLAC (output column action) table defines the action (ACTION) to be used when the specified column (COL) is included in a particular table definition.

OUTCOLAC

| COL | TABLEID | ACTION | PROTFLAG |
|---|---|---|---|
| CPU | SMF03004CPUTB | A | S |
| JOBNAME | SMF03004CPUTB | K3 | S |
| HOUR | SMF03004CPUTB | K2 | S |
| DATE | SMF03004CPUTB | K1 | S |

Valid ACTION in the OUTCOLAC Table may include:

| ACTION | KEYWORD | LONG DESCRIPTION |
|---|---|---|
| A | Add | Add current value to existing COL value. |
| H | High | Retain highest value encountered for COL. |
| I | Increment | Add one (1) to current value of COL. |
| Kn | Key | COL is the nth key for the output table. |
| L | Low | Retain the lowest value encountered. |
| P | Parent | COL is needed to resolve another COL. |
| R | Replace | Retain last (most recent) value for COL. |
| S | Save | Retain first value encountered for COL. |

One primary end product of system 10 is output data in the form of tables stored in a relational database and managed by a relational database manager, such as DB2. Data in output table columns may represent the input record fields directly or a calculation involving many input record fields. The organization of output data and tables 24 is results-oriented. In other words, output tables 24 are designed to maximize performance by subsequent applications that use output tables 24. A distinguishing characteristic of output tables 24 includes TIMESPANS and TIMESTAMPS columns. TIMESPAN is a column that must be specified when an output table 24 is defined to the OUTTBL dictionary table. TIMESPAN identifies the frequency with which new tables are created, and the form of the date that is used in the table name. Standard TIMESPAN Values may specify that daily, weekly, monthly, quarterly, or yearly tables are to be created.

Special TIMESPAN Values may also be used to specify time periods other than the daily through yearly periods. For example, a TIMESPAN A may be used to specify tables containing data accumulated for an accounting month. Accounting months may be defined as all the data collected between two dates that is used to bill resource usage the following month. Regardless of when data was generated, the collection of billing data is closed out as of a certain date and bills are generated. If any data collected after the closeout date has a record time stamp that indicates it was generated in the last accounting month, it is still placed in the current accounting month table.

Another special code is TIMESPAN B, which stands for the base table used by collector 20 for checkpointing or duplicate data detection. In system 10, each input record has a row entry in the base table. There must be at least one TABLEID with TIMESPAN B for each record type or the record type is not processed. The base table must contain a key column with the name CHKPTTS, which contains a DB2 format time stamp, for example. Any additional data fields required to identify a unique occurrence of a record should be added as additional key columns.

TIMESPAN X is a special week format for weekly transmission files. Instead of using the preceding Sunday as a start date for the table, a date independent of input time stamps is used to generate the table date. This is needed because of short weeks at month end, correction to invalids, suspend records, and other situations that make a record's time stamp unrelated to the table date desired.

TIMESPAN P indicates that the table is permanent or perpetual and that table date is not a relevant term. Each run of collector 20 either updates existing rows or adds new rows. The only method of deleting rows from a perpetual table is by a post-processor that issues an explicit delete command. Perpetual tables may be used as temporary holding tanks for detailed data later used for billing or other purposes.

Data dictionary tables 22 also include application tables 36, which provide a mechanism to refer to diverse output columns as a single group. For example, an ACTVAPPL table is used to activate or deactivate applications by specifying the logical system ID (LSYSID). The table contains a column of APPLIDs and a corresponding column of LSYSIDs, and presence of the APPLID-LSYSID combination in this table indicates that the application is active and data for this application is collected.

Application tables 36 also include an APPLCOLS table, which identifies which columns (COLs) are output to which output tables (TABLEIDs) for which applications (APPLID). Some applications are corporate supported and cannot be altered or deleted, but any number of applications can be added to collect data of interest at the local level. A PROTFLAG column may be used to indicate whether the entry may be deleted or modified by users using user interface 26.

| APPLCOLS | | | |
|---|---|---|---|
| COL | TABLEID | APPLID | PROTFLAG |
| CPU | SMF03004CPUTB | CORPAPPL | S |
| JOBNAME | SMF03004CPUTB | CORPAPPL | S |
| HOUR | SMF03004CPUTB | CORPAPPL | S |
| DATE | SMF03004CPUTB | CORPAPPL | S |

An APPL table of application tables 36 contains all valid applications, a brief description, and a DEFAULT column used to indicate if the application should be automatically added to the ACTVAPPL table for each system in the LSYSID table. The APPL table is also used for referential integrity; unless an application is defined in the APPL table, it cannot be used in other tables that contain the APPLID column.

| APPL | |
|---|---|
| APPLID | APPLDESC |
| CASDATA | CORPORATE CAPACITY ANALYSIS SYSTEM |
| IPACS | INFO. PROCESSING ACCOUNTING AND COSTING SYSTEM |
| PERFORM | IPC PERFORMANCE |
| SMF03001 | BASE APPLICATION FOR SMF 30 SUBTYPE 1 RECORDS |
| SM03001D | DETAIL APPLICATION FOR SMF 30 SUBTYPE 1 RECORDS |

| PROTFLAG | DEFAULT |
|---|---|
| S | Y |
| S | Y |
| S | Y |
| S | Y |
| S | N |
| S | N |

The DEFAULT column indicates whether the application is automatically included in the active application table (ACTVAPPL) for each LSYSID defined. If DEFAULT=Y, the ACTVAPPL table is automatically populated with entries for each system defined in the LSYSID table. Otherwise, entries to the ACTVAPPL table must be updated manually for each system for which the application is desired.

Data dictionary tables 22 further include system activity tables 38 to provide an audit trail and statistics detailing of all input and output data processed by collector 20. For example, the CHKPTSUM table retains summary information about data already processed. The CHKPTSUM table is used as a secondary check for duplicate data; the base table is the primary test for duplicate data. The key columns of each base table are defined to successfully distinguish one record from another in the input data stream. Records containing duplicate values for the key columns in base table are rejected as duplicates. When a base table is deleted, its rows are summarized to form entries in the CHKPTSUM table. The CHKPTRNG column in the RECTYPE table contains the value (in minutes) used to determine if two consecutive time stamps in the base table contain missing data. If the difference between two consecutive time stamps is greater than the CHKPTRNG, a new row is added to the CHKPTSUM table indicating missing data may exist. If the difference is less than CHKPTRNG the same row of the CHKPTSUM table is used. Any record with a time stamp falling in a range in the CHKPTSUM table is treated as a duplicate regardless of the values of the other key fields for the base table.

| CHKPTSUM | |
|---|---|
| TBLNAME | CHKPTDT |
| B040590.T1010SMF030004B ASE | 1990-04-05 |
| B040590.T1010SMF030004B ASE | 1990-04-05 |
| B040590.T1015SMF030004J BPF | 1990-04-05 |

| STARTTM | ENDTIME | RECNAME |
|---|---|---|
| 1990-04-05-00.00.00.00000 | 1990-04-05-10.15.00.00000 | SMF |
| 1990-04-05-10.45.01.00000 | 1990-04-05-23.59.00.00000 | SMF |
| 1990-04-05-00.00.00.10000 | 1990-04-05-23.59.00.10000 | SMF |

The TBLNAME column contains the fully qualified table name with all symbolics resolved. The CHKPTDT column contains the date corresponding to the date of the data in the base table. The STARTTM column contains the lowest time stamp value of the CHKPTRNG column in the RECTYPE table, and the ENDTIME column contains the highest time stamp value of the checkpoint time stamp range represented in the entry in the CHKPTSUM table. The format for STARTTM and ENDTIME is YYYY-MM-DD-HH.MM.SS.SSSSS.

A TABLECAT (table catalog) table of system activity tables 38 is used to track the activity and status of all output tables. The TABLECAT table includes table name, table ID, time stamp, deletion date, migration date, size, storage group, and statistical information on each table. A TBLSQL (table Structured Query Language) table contains the SQL needed to create or recreate a table. SQL is used to access and update all data stored in DB2, to define and create all logical and physical data objects, and to control data security. A DDNJOBST table (DDname job statistics) and DTL-JOBST (detail job statistics) table track the activity and job statistics of all collector runs. Included in the statistics are the highest return code, the start and end times, the CPU time, the number of commits, and the number of rollbacks. An EVENTLOG (event log) table tracks significant events occurring to data dictionary tables 22 to provide an audit trail. For example, table deletions, row insertions, row deletions, and the time stamp of these events are recorded in the EVENTLOG table. A MESSAGE table defines all output messages, and contains the limits associated with each message. Further, a STORGRP (storage group) table contains the various active storage groups available within system 10. A storage group is a named, VSAM catalog controlled set of DASD (direct access storage device) volumes on which DB2 databases are allocated. The VOLUME table identifies which volumes are associated with the active storage groups. A SYSTEM table is used to define system 10 to the business unit or organization using it. The SYSTEM table may contain the PSYSIDs and LSYSIDs of the machines on site.

Grants, views, and indexes are issued for each newly created table based on the SQL stored in a Grants/Views/Indexes tables 40. Indexes are automatically generated for each table and are used to speed searches through DB2 tables. An index is a set of pointers that are logically ordered by the values of a key. For each output table, a default index is defined that is equal to the keys named in the OUTCOLAC table. A INDEXTBL (index table) table can be used to specify additional indexes if desired. Additional indexes are needed only when frequently used search patterns differ from the key structure of the table.

A view is a logical DB2 table consisting of a subset of columns from one or more DB2 tables. A view is a logical object and does not exist physically. A view is used to either simplify or restrict access to the information contained in specific columns and/or rows of one or more tables. A VIEWTBL table contains the SQL needed to produce the predefined view, while a VIEWDEP (view dependencies) table lists the tables that must exist for the same time stamp before the view can be created. Views are defined in several different tables. Columns within a view are defined in a VIEWCOL (view column) table. A VWCOLAC (view column action) table identifies the action and the column associated with each view column. A VWOUTCOL (view output column) contains the formula needed to define a view column, and an APPLVCOL (application view column) table defines which columns are to be included in a view based on the application.

Grants are the rules authorizing access to the data. A GRANTTBL (grant table) table contains the table grant rules to be issued each time a new table with the same TABLEID is created. A GRANTVW (grant view) table contains the grant view rule to be issued when all tables comprising the view have been created.

Note that data dictionary tables 22 are not independent of one another. The relationships between the tables are expressed in the form of constraints. If one table is named as a constraint as a second table, then an entry must exist in the first table before rows with the key value can be added to the second table. For example, APPL and LSYSID tables are constraints on the ACTVAPPL table. This means the APPL column must be defined in the APPL table and the LSYSID column must be defined in the LSYSID table before the APPLID/LSYSID combination can be added as an entry in the ACTVAPPL table. Constraints impact critical operations involving data dictionary tables 22. For example, user interface 26, prevent the addition of a row to a table if the constraints have not been met. Similarly, rows cannot be deleted using user interface 26 if a restrict rule is in effect and a lower level table uses the entry. For example, an application cannot be deleted from the APPL table until all entries in the ACTVAPPL table with the same APPLID are also deleted. On the other hand, if a form of constraint, cascade constraint, applies, deleting one entry may cause all lower levels to be deleted. For example, deleting a system from the LSYSID table causes the deletion of all rows in the ACTVAPPL table for that LSYSID.

FIGS. 3-8 are flowcharts of exemplary process flows of collector 20. References are made to data dictionary tables 22 as they are used to direct process flow, and to process and compute data.

Figure 3:
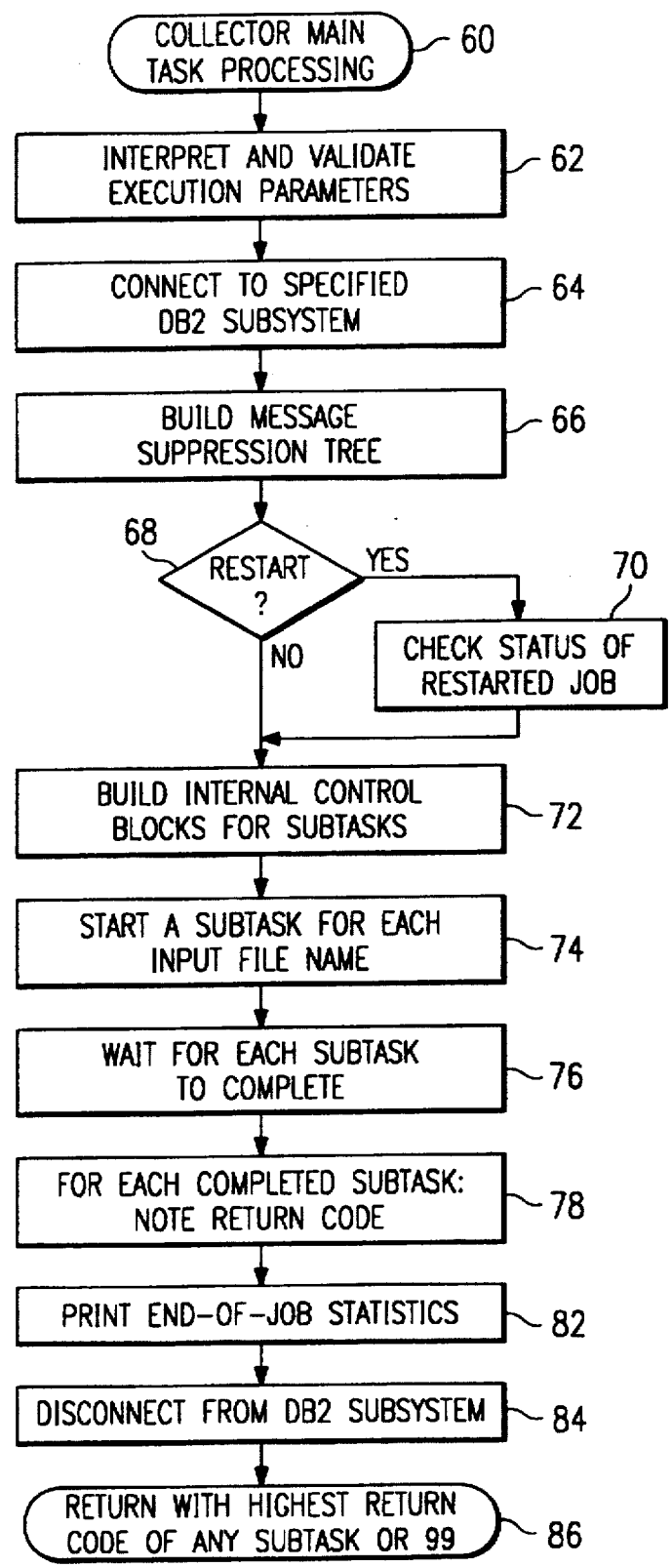
FIG. 3 is a simplified flowchart of an exemplary collector main task process.

Referring to FIG. 3, the collector main task processing is shown beginning in block 60. Collector 20 is preferably a batch program that reads one or more input files and writes information derived from the input data to one or more output tables. To maximize throughput, collector 20 is a multi-tasking program that initiates a separate input task for each input file. Collector 20 dynamically creates and alters any needed database object including databases, tablespaces, tables, indexes, views, and grants. Tablespace is defined in DB2, for example, as the physical spaces that holds tables. Database is defined in DB2, for example, as a collection of one or more tablespaces. Collector 20 may be run as soon as any input file becomes available or throughout the day as often as desired. The collector main task begins by interpreting and validating execution parameters, as shown in block 62. The program execution parameters control the operation of collector 20 including all input subtasks. The execution parameters can be specified either in the PARM keyword on the EXEC statement in the collector JCL (job control language), or it can be specified on the PROGRAM parameter card in a PARMS SYSIN file. An exemplary list of execution parameters includes the following:

1. PLAN={plan name|main task}Identifies the DB2 plan to use, 1-8 characters.
2. SYS=ssss Required parameter that identifies the DB2 subsystem to be used, 1-4 characters.
3. TRACE=xxxx Used specifically for debugging purposes to dump structures after specific checkpoints.
4. CHECK={Y|N}Used to specify that validation of parameters is desired. This option checks the parameters and indicates any syntax errors.
5. MSGLIM={1|2|3|4}Specifies what messages are to be displayed while processing. Message types include error, informational, trace, and warning messages.
6. COMMIT=[# of seconds|180}Specifies DB2 commit interval used to maximize multi-tasking throughput while minimizing certain DB2 contention caused by locking. A DB2 commit is executed when either the interval exceeds this value or the number of rows changed since the previous commit exceeds the value in the COMMIT column of the RECNAME table. A DB2 commit is also executed when a DB2 object is created or modified.
7. RESTART={Y|N}If no JOBNAME is specified, a search is done in the DDNJOBST table for the latest entry that matches the current JOBNAME from the JCL. If no match is found, an error message is provided. If a match is found, collector 20 skips all previously processed records as indicated by the PROCESS column of the DTLJOBST table and begins processing the remaining records.
8. RESTART=(JOBNAME) A search is done in the DDNJOBST table for the latest entry that matches the specified JOBNAME. If no match is found, an error message is provided. If a match is found, collector 20 skips all previously processed records as indicated by the PROCESS column of DTLJOBST table and begins processing the remaining records. This variation of the RESTART parameter is useful if collector 20 is restarted with a different job name than the previous run.
9. RESTART=(JOBNAME,JOBNUM) A search is done in the DDNJOBST Table for the latest entry that matches the specified JOBNAME and JOBNUM. If no match is found, an error message is provided. If a match is found, collector 20 skips all previously processed records as indicated by the PROCESS column of the DTLJOBST table and begins processing the remaining records. This variation of the RESTART parameter is useful if another collector is running or has run since the collector that needs to be restarted.

In block 64, collector 20 connects to the DB2 subsystem specified in the execution parameters, SYS. Thereafter, a message suppression tree is built, as shown in block 66, which determines the level of messages to be activated or suppressed as specified in the TRACE and MSGLIM execution parameters. If the RESTART execution parameter is specified as determined in block 68, the status of the restarted job is determined in block 70. In blocks 72 and 74, the internal control blocks are built for all subtasks and starts a subtask for each input file or data set that contains valid parameters and passes a unique thread to each subtask. Therefore, each subtask processes one type of data, and multiple types of data may be processed in this multi-tasking environment by executing only one job. Input files of the same type of data may be concatenated together for processing by the same subtask.

Thereafter, main task 60 waits for each subtask to complete processing, as shown in block 76. For each completed subtask, main task 60 notes whether it abended and what return code was returned by the subtask, as shown in blocks 78 and 80. Possible return codes may include:

| | |
|---|---|
| 0 | All input records were processed without warning or errors. |
| 4 | All input records were processed and warning messages were encountered. |
| 8 | Some input records could not be processed due to errors. |
| 12 | A severe error caused collector 20 to cancel all processing before the end of one or more input files. |
| 30 | Collector 20 encountered an error before attempting to process any input files. |
| 99 | The input subtask for one or more input files abended before reading the end of the file. |

The return codes assist in determining the appropriate procedure to use when restarting collector 20. When all the subtasks are completed, the end-of-job statistics are then printed and the main task disconnects from the DB2 subsystem, as shown in blocks 82 and 84. The main task then returns with the highest return code of all subtasks, as shown in block 86.

Figure 4A:
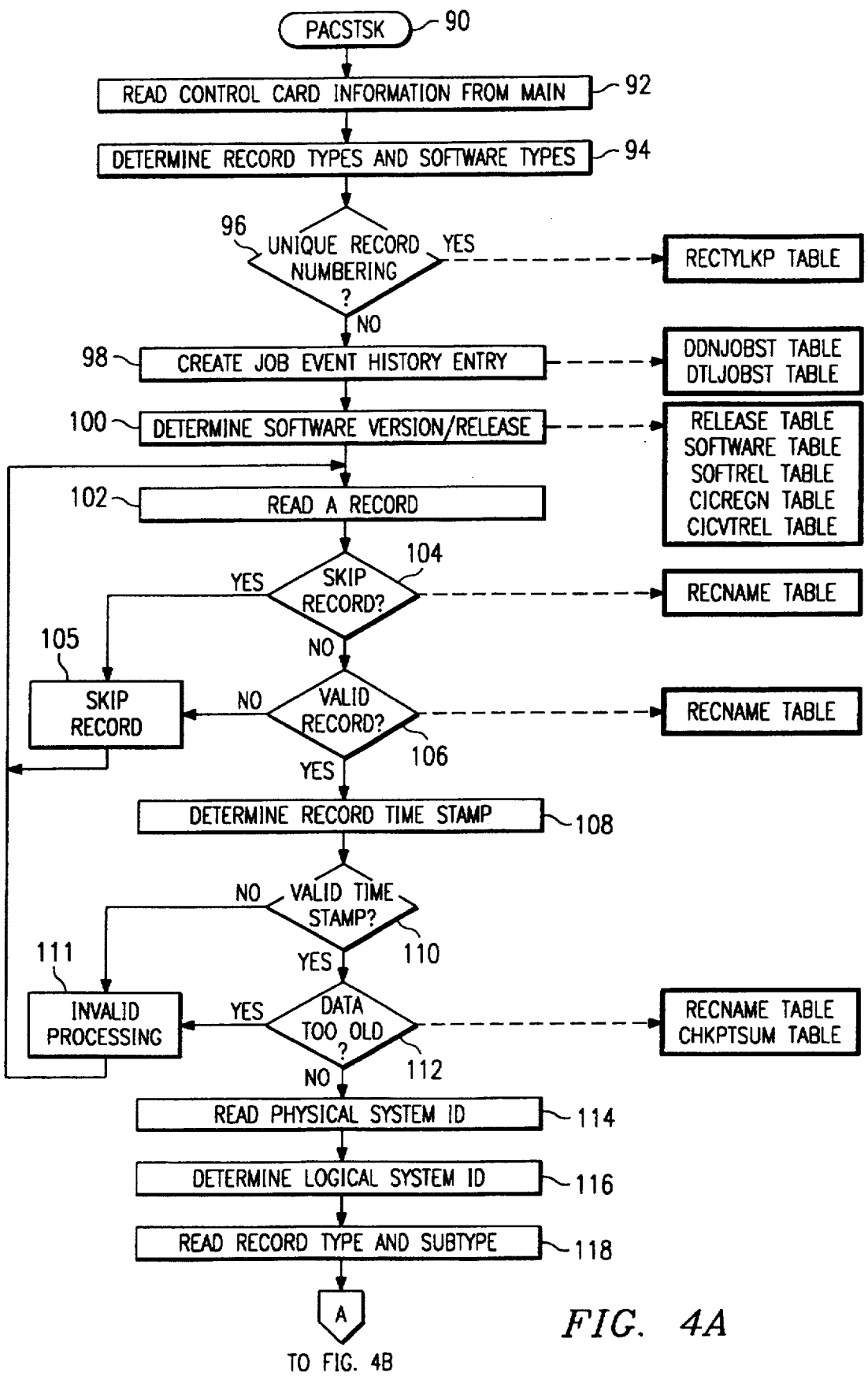
FIGS. 4A and 4B show a simplified flowchart of an exemplary PACSTSK process.
Figure 4B:
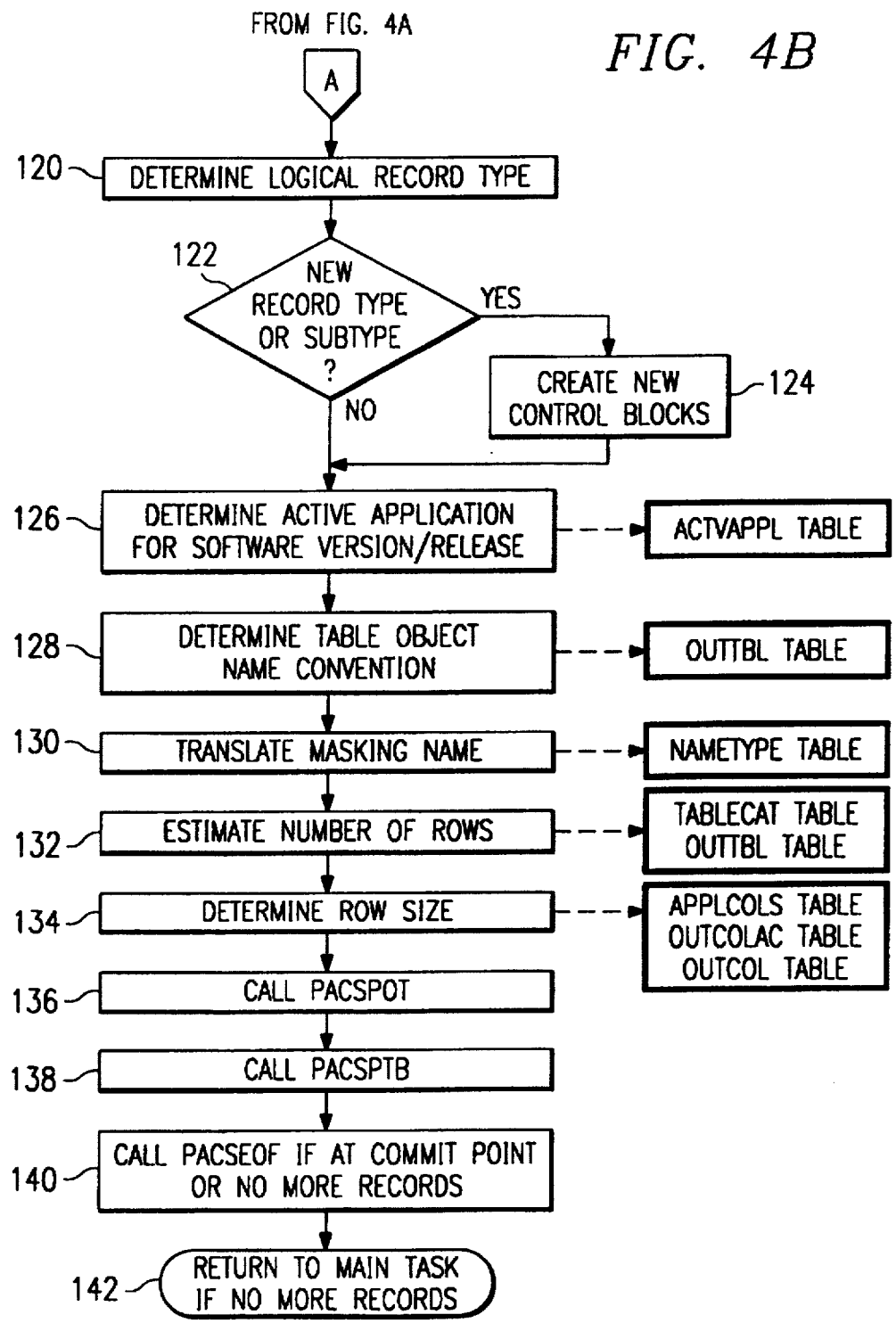

FIG. 4A and 4B shows the subtask process flow, PACSTSK 90, as each subtask reads and processes records of one type of data or compatible data. The subtask receives control card information from the main task, which may include information on the record and data being processed and the resource monitor software used to generate the data record. Therefore, the information includes the record types and software types, as shown in block 94. Then if the record is of a record type that does not follow conventional record numbering, as determined in block 96, a RECTYLKP (record type lookup) table is consulted to convert the record number to a standard record number that is defined within system 10. Thereafter in block 98, a job event history entry is created in DDNJOBST and DTLJOBST tables to log the job statistics.

The process flow then determines how to read the input data records by ascertaining which software and release version was used to generate the data by consulting the RELEASE, SOFTWARE, SOFTREL, CICREGN, and CICVTREL tables, as shown in block 100. Subsequently a record is read, as shown in block 102. If the record is to be skipped, as determined by consulting the RECNAME table, a SKIPREC formula in the execution parameters, and/or some other sources, the current record is skipped, as shown in blocks 104 and 105. Otherwise, the record is then checked against the RECNAME table and/or a VALIDREC formula in block 106 to determine whether it is a valid record. The record is skipped if it is invalid. The record time stamp is then determined, as shown in block 108. If the time stamp is not valid, as determined in block 110, the record is either marked as invalid for later processing by some other means of error management method, as shown in block 111. Input records that cannot be processed may be written to an output file for later processing. The CHKPTRET column from the RECNAME table is used to determine if the data is too old to process in block 112. The CHKPTRET column defines the number of days that row entries in the CHKPTSUM table are kept before they are deleted. The age of the record is determined by subtracting the record time stamp from the current date and time. If the record age is greater than the CHKPTRET value, the record is defined as too old to process, although mechanisms may be provided to force processing, if desired. If a force parameter is present to force processing, process flow continues to block 114. Otherwise, the record is treated as invalid.

The physical system ID (PSYSID) is then read to lookup the logical system ID (LSYSID), and the record type and subtype (RECTYPE and SUBTYPE) are read to determine the logical record type, as shown in blocks 114–120. If this is a new RECTYPE or SUBTYPE for this subtask, new control blocks are started, as shown in block 124. New control blocks may include lists of valid input fields and output columns for this record, and the formulas for determining the values of the output columns. In block 126, it is determined which active applications are active for this combination of software and release version by using the ACTVAPPL table and certain execution parameters and control cards. In block 128 and 130, the NAMETYPE column from the OUTTBL table is used to translate the software and release combination to an output object naming convention, and the DBASE column from the NAMETYPE table is used to convert a symbolic name to a system-assigned unique database name. If the DB2 catalog does not already contain the named database, then the database is created.

The process flow then determines the tablespace requirement. This is done by estimating the number of rows, using TABLECAT and OUTTBL tables, and by determined the row size using APPLCOLS, OUTCOLAC, and OUTCOL tables. An algorithm that takes into account the information from the above-identified tables and the size of certain existing tables (from the TABLECAT table) is used to compute the tablespace requirements. Thereafter in blocks 136 and 138, subtasks PACSPOT and PACSPTB are called to continue processing the input data records. Another subtask PACSEOF is then called in block 140 to complete data processing, and the process flow returns to the main task in block 142.

Figure 5:
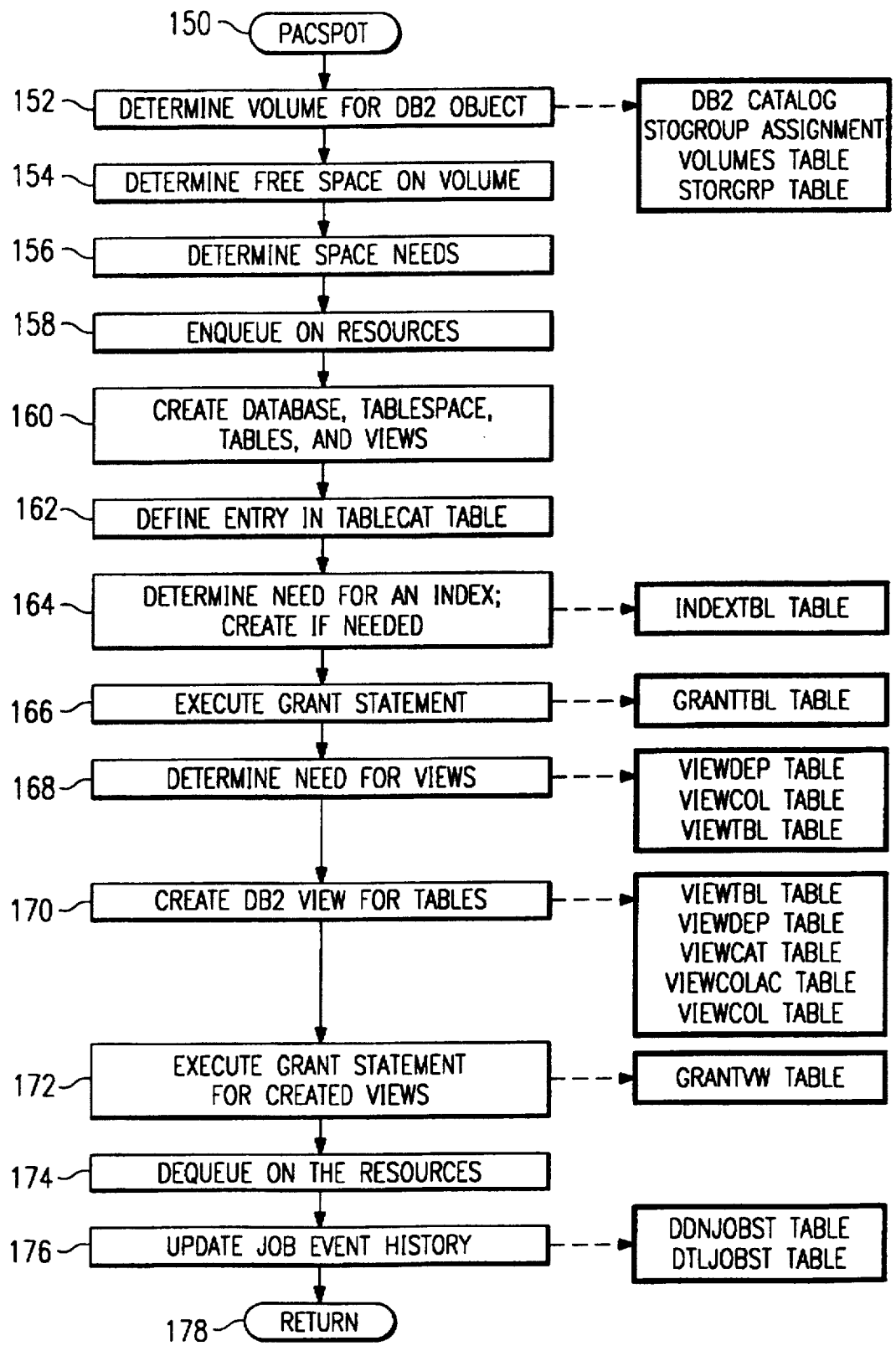
FIG. 5 is a simplified flowchart of an exemplary PACSPOT process.

An exemplary process flow of the PACSPOT subtask is shown in FIG. 5 beginning in block 150. The primary function of PACSPOT is to create DB2 objects in a multi-tasking environment. Mechanisms are provided to prevent deadlocks on resources. In block 152, the process flow first determines on which data storage volume the output object is to be created. The DB2 catalog is used to evaluate the storage group (STOGROUP) assigned and the VOLUME and STORGRP tables are also used. The VOLUME table identifies which volume(s) are associated with which active storage group(s) and the STORGRP table identifies the active storage groups in system 10. The amount of free space on the candidate volume is then determined and compared to the determined space needs for the object to be created on the volume, as shown in blocks 154 and 156. Once a volume is selected, the subtask enqueues on the storage device or resources and creates the database, tablespace, tables, and views on the volume, as shown in blocks 158 and 160. An entry is then created in a TABLECAT table in order to track the activity and the status of the newly created output table, as shown in block 162. If an auxiliary index is needed for the newly created output table, then the INDEXTBL table is used to obtain the SQL needed to create the index, as shown in block 164. The GRANTTBL table is then used to obtain and execute the grant SQL for the created objects, as shown in block 166. If a view is needed as determined by consulting the VIEWDEP, VIEWCOL, and VIEWTBL tables, then the views are created by using information in VIEWTBL, VIEWDEP, VIEWCAT, VIEWCOLAC, and VIEWCOL tables, as shown in blocks 168 and 170. The grant statement for the view just created is then obtained from the GRANTVW table and executed in block 172. Thereafter in blocks 174 and 176, the subtask dequeues on the resource, and updates the job event history in DDNJOBST and DTLJOBST tables with information on the newly created objects. The subtask then returns in block 178.

Figure 6:
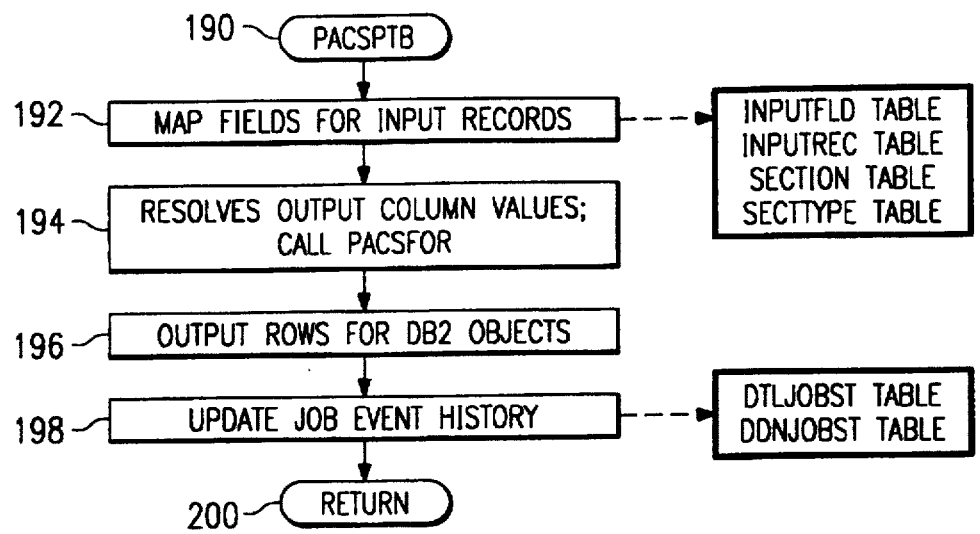
FIG. 6 is a simplified flowchart of an exemplary PACSPTB process.

An exemplary process flow for the PACSPTB subtask is shown in FIG. 6 and beginning in block 190. The primary function of the PACSPTB subtask is to compute and resolve formulas to provide values to the rows in the output tables and to output the rows to DB2 tables. The PACSPTB subtask maps fields of the input records to the output tables by using INPUTFLD, INPUTREC, SECTION, and SECTTYPE tables, as shown in block 192. The PACSFOR subroutine or subtask is called to evaluate the formula language to compute the output column values, as shown in block 194. The values returned are then provided as output to populate the rows of the DB2 output table, as shown in block 196. The DTLJOBST and DDNJOBST tables are then updated. The subtask returns in block 200.

Figure 7:
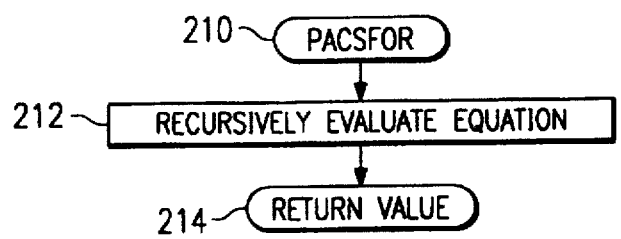
FIG. 7 is a simplified flowchart of an exemplary PACSFOR process.

An exemplary process flow for the PACSFOR subroutine or subtask 210 is shown in FIG. 7. PACSFOR recursively evaluates the formula or equation to finally yield a value, as shown in block 212, which is then returned to the calling subtask in block 214. In an embodiment of the PACSFOR lists and tree structures are used to resolve the formula. PACSFOR also may invoke dictionary tables and other tables as needed to obtain lookup values.

Figure 8:
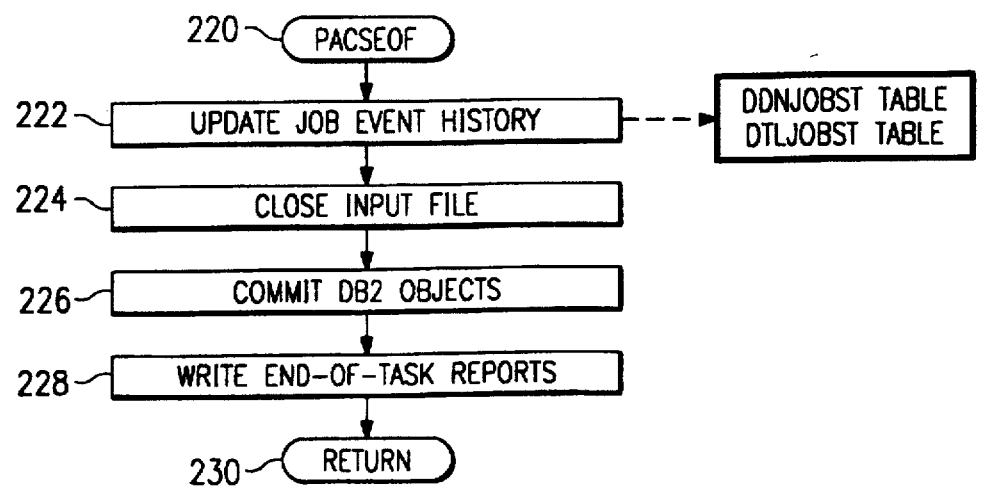
FIG. 8 is a simplified flowchart of an exemplary PACSEOF process.

An exemplary process flow for the PACSEOF subroutine or subtask 220 is shown in FIG. 8. PACSEOF updates the job event history and statistics in the DDNJOBST and DTLJOBST tables, as shown in block 222. In blocks 224 and 226, the input files are closed and DB2 objects are committed. End-of-task reports, if any, are written, as shown in block 228. The subtask returns in block 230.

Constructed in this manner, system 10 receives, processes, and outputs data dynamically. Data are received and their format is determined by consulting data dictionary tables 22. The input data may be mapped to the output tables and/or reports either directly or after processing and formula evaluation. The content and format of the output data, tables and reports are also defined by data dictionary tables 20. Because data dictionary tables 20 can be altered, the operation of collector 20 can be modified and updated easily without changing the source code and recompiling the program. For an organization that encompasses several business units spanning the globe all reporting to a central site, system 10 provides the needed flexibility and efficiency to collect, manage, and process the diverse data collected.

Although the present invention and its advantages have been described in detail, it should be understood that various changes, substitutions and alterations can be made therein without departing from the spirit and scope of the invention as defined by the appended claims.

What is claimed is:

1. A system for collecting and processing input data and generating output data, comprising:
   at least one input processing table having format and content information of said input data;
   at least one output processing table having format and content information of said output data; and
   a process spawning at least one subtask, said subtask accessing said input processing table for determining how said input data are to be read, and further accessing said output processing table for determining how to create and format said output data.

2. The system, as set forth in claim 1, further comprising a user interface providing interactive access to said input and output processing tables.

3. The system, as set forth in claim 2, wherein said user interface further provides interactive access to said output data.

4. The system, as set forth in claim 1, wherein said input data are in the form of records and said output data are in the form of tables and reports.

5. The system, as set forth in claim 1, further comprising at least one view table containing rules for providing logical views of said output data having predetermined columns and rows.

6. The system, as set forth in claim 1, further comprising at least one grant table containing rules for authorizing access to said output data.

7. The system, as set forth in claim 1, wherein said input data are generated by a plurality of software and said at least one input processing table includes a table defining a software and release combination that generated said input data.

8. The system, as set forth in claim 1, wherein said input data are in the form of records and are generated by a plurality of software and said at least one input processing table includes a table defining sections and offsets into said input data records to each section.

9. The system, as set forth in claim 1, wherein said input data are in the form of records and are generated by a plurality of software and said at least one input processing table includes a table defining sections and section offsets into said input data records, and a table defining fields and field offsets into said sections.

10. The system, as set forth in claim 1, wherein said output data are in the form of tables and said output processing table further comprises a table containing information for naming said output data tables.

11. The system, as set forth in claim 1, wherein said output data are in the form of tables and said output processing table further comprises a table defining the information to be contained in each output data table.

12. The system, as set forth in claim 1, wherein said output data are in the form of tables and said output processing table further comprises a table defining the formulas to compute for values to be contained in each output data table.

13. The system, as set forth in claim 1, wherein said output processing table further comprises a table defining the action to be taken when a particular data element is present in an input processing table or output processing table.

14. The system, as set forth in claim 1, wherein said input data are in the form of records and said output data are in the form of tables, said output processing table further comprises a table specifying data input records used as input to output data tables.

15. The system, as set forth in claim 1, further comprising at least one system definition table containing information on a system from which said input data are collected.

16. The system, as set forth in claim 1, further comprising at least one system definition table containing record type and record name of said input data.

17. The system, as set forth in claim 1, further comprising a base table containing information unique to each processed input data record, said input data being in the form of input data records, said base table being used to avoid duplicate processing of input data records.

18. The system, as set forth in claim 1, further comprising a checkpoint summary table containing a range of time stamps of processed input data, said input data being in the form of input data records and each said record includes a time stamp, said checkpoint summary table being used to avoid duplicate processing of input data records.

19. The system, as set forth in claim 1, further comprising a table containing a formula for creating a table.

20. The system, as set forth in claim 1, further comprising a table recording job activities and statistics.

21. The system, as set forth in claim 1, further comprising a table logging all activities performed on each table.

22. The system, as set forth in claim 1, wherein said process is a multi-tasking process spawning a plurality of subtasks, each subtask processing one type of data.

23. A method for collecting and processing input data and generating output data in response thereto, comprising the steps of:

reading said input data according to at least one input processing table having format and content information of said input data;

generating said output data according to at least one output processing table having format and content information of said output data; and said reading and generating steps being performed in a process spawning at least one subtask, said subtask accessing said input processing table for determining how said input data are to be read, and further accessing said output processing table for determining how to create and format said output data.

24. The method, as set forth in claim 23, further comprising the step of providing interactive access to said input and output processing tables.

25. The method, as set forth in claim 24, further comprising the step of providing interactive access to said output data.

26. The method, as set forth in claim 23, wherein said input data reading step includes the step of reading input data records and said output data generation step includes the step of generating output tables and reports.

27. The method, as set forth in claim 23, further comprising the step of providing logical views of said output data having predetermined columns and rows according to at least one view table containing viewing rules.

28. The method, as set forth in claim 23, further comprising the step of authorizing access to said output data according to at least one grant table containing rules therefor.

29. The method, as set forth in claim 23, wherein said input data are generated by a plurality of software and the step of reading input data includes the step of accessing a table defining a software and release combination that generated said input data.

30. The method, as set forth in claim 23, wherein the step of reading input data includes the step of reading input data records according to a table defining sections and offsets into said input data records to each section.

31. The method, as set forth in claim 23, wherein the step of reading input data includes the step of reading input data records according to a table defining sections and section offsets into said input data records, and a table defining fields and field offsets into said sections.

32. The method, as set forth in claim 23, wherein the step of generating output data includes the step of generating output data tables according to a table containing information for naming said output data tables.

33. The method, as set forth in claim 23, wherein the step of generating output data includes the step of generating output data tables according to a table defining the information to be contained in each output data table.

34. The method, as set forth in claim 23, wherein the step of generating output data includes the step of generating output data tables according to a table defining the formulas to compute for values to be contained in each output data table.

35. The method, as set forth in claim 23, wherein the step of generating output data includes the step of generating output data tables according to a table defining the action to be taken when a particular data element is present in an input processing table or output processing table.

36. The method, as set forth in claim 23, wherein the step of generating output data includes the step of generating output data tables according to a table specifying which data input records are used as input to said output data tables.

37. The method, as set forth in claim 23, further comprising the step of accessing a system definition table containing information on a system from which said input data are collected.

38. The method, as set forth in claim 23, further comprising the step of accessing at least one system definition table containing record type and record name of said input data.

39. The method, as set forth in claim 23, further comprising the step of accessing a base table containing information unique to each processed input data record, said input data being in the form of input data records, said base table being used to avoid duplicate processing of input data records.

40. The method, as set forth in claim 23, further comprising the step of accessing a checkpoint summary table containing a range of time stamps of processed input data, said input data being in the form of input data records and each said record includes a time stamp, said checkpoint summary table being used to avoid duplicate processing of input data records.

41. The method, as set forth in claim 23, further comprising the steps of:

creating a base table for a group of input data records;

adding an entry in said base table for each processed input data record;

accessing said base table prior to reading each input data record for processing; and skipping an input data record if an entry representative thereof is found in said base table.

42. The method, as set forth in claim 23, further comprising the step of accessing a table containing a formula for creating a table.

43. The method, as set forth in claim 23, further comprising the step of recording job activities and statistics in a table.

44. The method, as set forth in claim 23, further comprising the step of logging all activities performed on each table in a table.

45. The method, as set forth in claim 23, wherein said reading and generating steps are performed in a multitasking process spawning a plurality of subtasks, each subtask processing one type of data.

46. A plurality of dictionary tables for controlling a data processing process receiving input data and generating output data, comprising:

at least one input processing table having format and content information of said input data; and at least one output processing table having format and content information of said output data.

47. The dictionary tables, as set forth in claim 46, further comprising at least one view table containing rules for providing logical views of said output data having predetermined columns and rows.

48. The dictionary tables, as set forth in claim 46, further comprising at least one grant table containing rules for authorizing access to said output data.

49. The dictionary tables, as set forth in claim 46, wherein said input data are generated by a plurality of software and said at least one input processing table includes a table defining a software and release combination that generated said input data.

50. The dictionary tables, as set forth in claim 46, wherein said input data are in the form of records and are generated by a plurality of software and said at least one input processing table includes a table defining sections and offsets into said input data records to each section.

51. The dictionary tables, as set forth in claim 46, wherein said input data are in the form of records and are generated by a plurality of software and said at least one input processing table includes a table defining sections and section offsets into said input data records, and a table defining fields and field offsets into said sections.

52. The dictionary tables, as set forth in claim 46, wherein said output data are in the form of tables and said output processing table further comprises a table containing information for naming said output data tables.

53. The dictionary tables, as set forth in claim 46, wherein said output data are in the form of tables and said output processing table further comprises a table defining the information to be contained in each output data table.

54. The dictionary tables, as set forth in claim 46, wherein said output data are in the form of tables and said output processing table further comprises a table defining the formulas to compute for values to be contained in each output data table.

55. The dictionary tables, as set forth in claim 46, wherein said output processing table further comprises a table defining the action to be taken when a particular data element is present in an input processing table or output processing table.

56. The dictionary tables, as set forth in claim 46, wherein said input data are in the form of records and said output data are in the form of tables, said output processing table further comprises a table specifying data input records used as input to output data tables.

57. The dictionary tables, as set forth in claim 46, further comprising at least one system definition table containing information on a system from which said input data are collected.

58. The dictionary tables, as set forth in claim 46, further comprising at least one system definition table containing record type and record name of said input data.

59. The dictionary tables, as set forth in claim 46, further comprising a base table containing information unique to each processed input data record, said input data being in the form of input data records, said base table being used to avoid duplicate processing of input data records.

60. The dictionary tables, as set forth in claim 46, further comprising a checkpoint summary table containing a range of time stamps of processed input data, said input data being in the form of input data records and each said record includes a time stamp, said checkpoint summary table being used to avoid duplicate processing of input data records.

61. The dictionary tables, as set forth in claim 46, further comprising a table containing a formula for creating a table.

62. The dictionary tables, as set forth in claim 46, further comprising a table recording job activities and statistics.

63. The dictionary tables, as set forth in claim 46, further comprising a table logging all activities performed on each table.

* * * * *